United States Patent
Prevotat et al.

(10) Patent No.: US 6,905,642 B2
(45) Date of Patent: Jun. 14, 2005

(54) METHOD AND CONTINUOUS PRODUCTION LINE OF PLASTIC TUBES WITH BI-AXIAL DRAWING, AND RESULTING PLASTIC TUBE

(75) Inventors: Bernard Prevotat, Marnes la Coquette (FR); Guillaume Duval, Urt (FR)

(73) Assignee: Alphacan, La Celle Saint Cloud (FR)

( * ) Notice: Subject to any disclaimer, the term of this patent is extended or adjusted under 35 U.S.C. 154(b) by 429 days.

(21) Appl. No.: 10/240,226

(22) PCT Filed: Mar. 12, 2001

(86) PCT No.: PCT/FR01/00731

§ 371 (c)(1),
(2), (4) Date: Sep. 26, 2002

(87) PCT Pub. No.: WO01/72499

PCT Pub. Date: Oct. 4, 2001

(65) Prior Publication Data

US 2003/0141617 A1 Jul. 31, 2003

(30) Foreign Application Priority Data

Mar. 29, 2000 (FR) .............................. 00 03931

(51) Int. Cl.⁷ .............................................. B29D 22/00
(52) U.S. Cl. ...................... 264/40.7; 264/566; 425/135; 425/141; 425/326.1; 425/380; 425/387.1; 425/392; 428/35.7
(58) Field of Search ............................. 264/40.1, 40.7, 264/566; 425/135, 141, 326.1, 380, 392, 387.1; 428/35.7

(56) References Cited

U.S. PATENT DOCUMENTS

| | | | |
|---|---|---|---|
| 3,160,130 A | * 12/1964 | Pesak | ............................. 72/56 |
| 3,264,383 A | * 8/1966 | Niessner et al. | ............ 264/563 |
| 3,772,118 A | 11/1973 | Walter | ......................... 156/172 |
| 4,499,045 A | * 2/1985 | Obsomer | ..................... 264/532 |
| 4,882,104 A | * 11/1989 | Dobrowsky | ................. 264/40.1 |
| 5,948,332 A | * 9/1999 | Prenger | ...................... 264/40.5 |
| 6,447,710 B1 | 9/2002 | Prevotat et al. | |

FOREIGN PATENT DOCUMENTS

| | | |
|---|---|---|
| FR | 2207793 | 6/1974 |
| FR | 73.42291 | 6/1974 |
| FR | 80960 | 4/1979 |
| FR | 2 753 648 | 3/1998 |
| RO | 80960 A | 4/1983 |
| WO | WO 90/02644 | 3/1990 |
| WO | WO 95/25626 | 9/1995 |
| WO | WO 97/06940 | 2/1997 |
| WO | WO 98/35814 | 8/1998 |

OTHER PUBLICATIONS

PCT/FR01/00731 International Search Report dated Jun. 14, 2001.

* cited by examiner

*Primary Examiner*—Suzanne E. McDowell
(74) *Attorney, Agent, or Firm*—Smith, Gambrell & Russell, LLP

(57) ABSTRACT

The invention concerns a continuous manufacturing method which consists in producing a blank (E) by extrusion, bringing said blank to a temperature for molecular orientation, passing said blank around a radial expansion mandrel (12); gauging and cooling while subjecting the blank to axial traction. The radial expansion produced on the mandrel (12) is partial so that the internal diameter (B) of the blank (E), when it leaves the mandrel, is less than the nominal internal diameter (D) of the finished tube; performing an additional radial expansion of the blank, up to its nominal diameter, by internal fluid pressure. In permanent operating conditions, the inner surface of the blank (E) is no longer in contact with the mandrel (12).

25 Claims, 4 Drawing Sheets

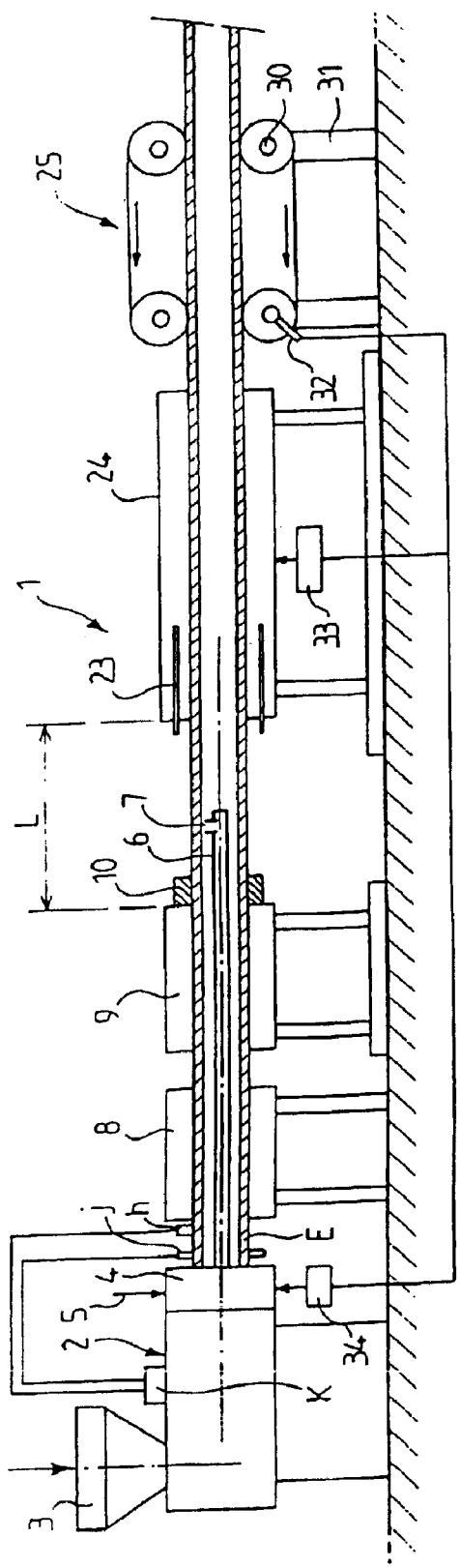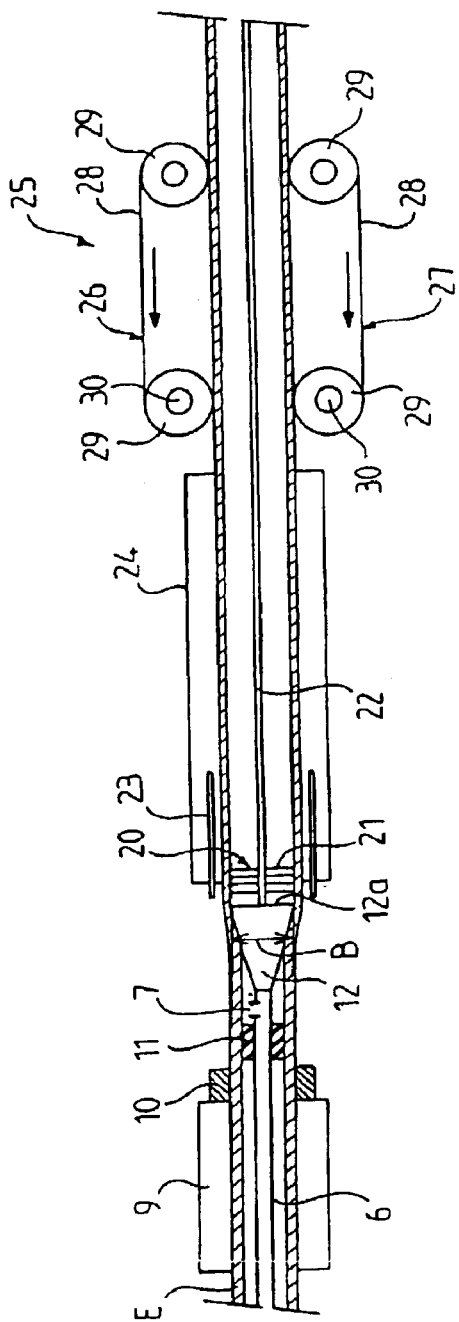

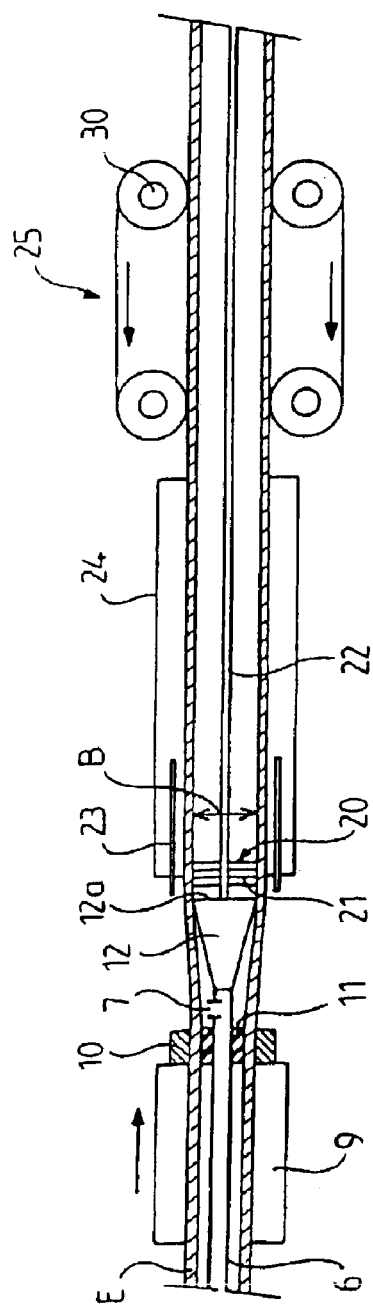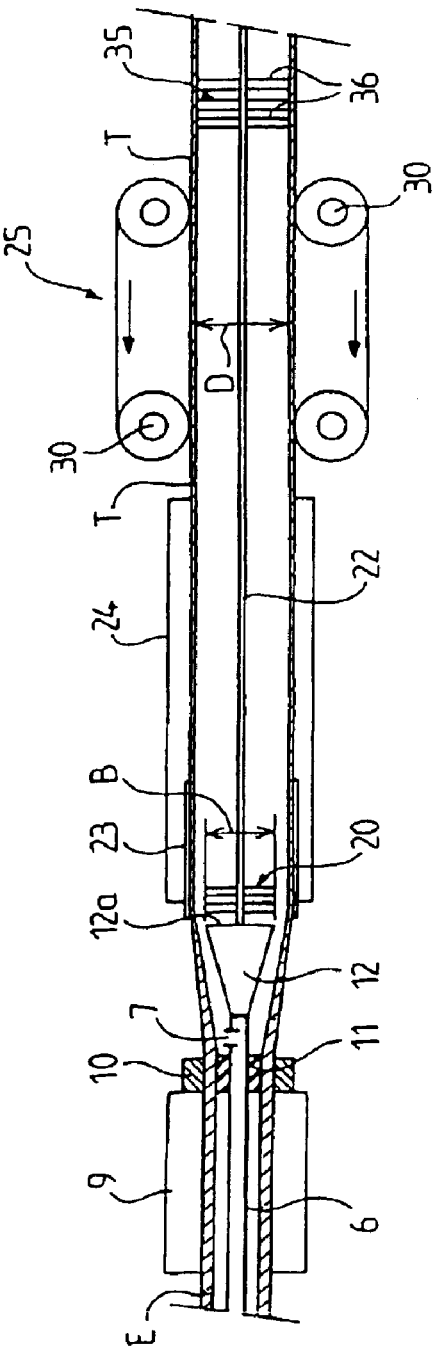

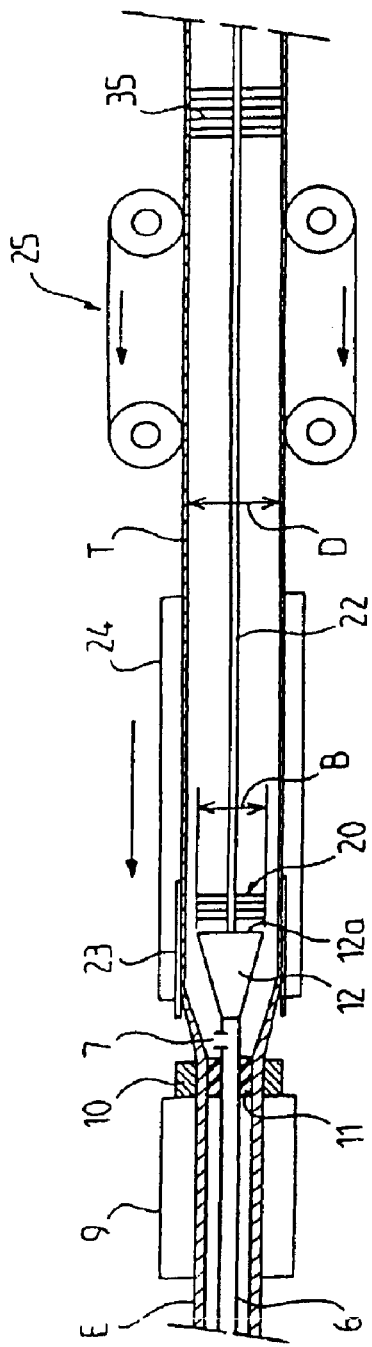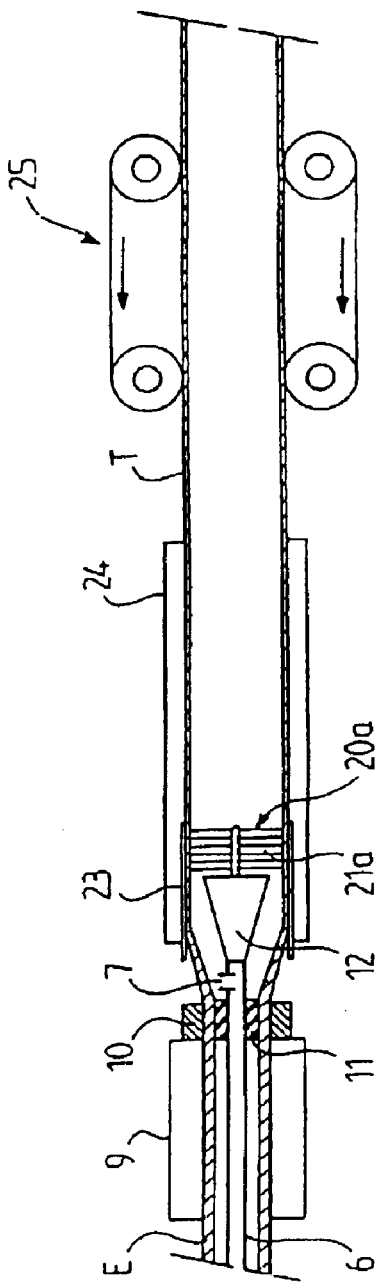

METHOD AND CONTINUOUS PRODUCTION LINE OF PLASTIC TUBES WITH BI-AXIAL DRAWING, AND RESULTING PLASTIC TUBE

The invention relates to a process for the continuous manufacture of plastic pipes with biaxial drawing, in which a tube blank is formed by extrusion and then subjected to combined axial pulling and radial expansion.

FR-A-2 753 648 relates to a process of this type, especially for relatively large diameter pipes, in particular for diameters greater than 150 mm. This process, which is satisfactory, is however a batch process. In certain cases, especially for smaller pipe diameters, it is desirable for the process to be continuous so as to further improve the productivity and to reduce the investment cost per unit produced.

Continuous manufacture of a pipe with biaxial drawing poses a problem as regards performing the radial expansion of the pipe in one region of the manufacturing line. Furthermore, the startup phase of the process is tricky.

FR-A-2 207 793 discloses a process for the continuous manufacture of plastic pipes with biaxial drawing, in which the radial expansion is performed with the aid of a frustoconical mandrel. Means for pulling on the pipe are provided downstream and upstream of this mandrel. The large base of the frustoconical mandrel is extended by a cylinder of the same diameter, which penetrates a sizing device. The external diameter of the large base of the truncated cone and of the cylinder which extends it determine the inside diameter of the finished pipe.

WO 95/25626 relates to a continuous manufacturing process of the same kind as the one above, with a mandrel for the radial expansion, the diameter of the large base of the mandrel defining the inside diameter of the finished pipe. Means for pushing the tube blank are provided upstream of the mandrel, while a haul-off is provided downstream of the mandrel.

The use of a mandrel simplifies the line startup operation, especially as regards the radial expansion. The tube blank matches the frustoconical outer surface of the mandrel and thus undergoes a relatively well controlled expansion. However, the friction forces are relatively high.

Rumanian patent No. 80960 shows a mandrel of increasing diameter having a section in the form of a cross, the arms of which are provided at their ends with castors. A plastic pipe undergoes a radial expansion on this mandrel, followed by a radial contraction. The cross shape of the cross-section of the mandrel means that the external surface of the mandrel is not continuous, which may produce marks on the pipe and cause variable and uncontrolled drawing around the same circumference.

WO 90/02644 relates to a process in which the radial expansion of the pipe is obtained by internal hydraulic pressure exerted in a chamber closed upstream by a first plug corresponding to the inside diameter of the tube blank and, downstream of a sizing device, by another plug which can be inflated by the effect of pressure. This plug, when not inflated, makes it possible to start up the line with an initial diameter and then, by inflating it, to reach the nominal inside diameter of the finished pipe.

WO 97/06940 also uses an inflatable downstream plug and provides a means of controlling the expansion of the pipe in response to various parameters which indicate, directly or indirectly, a variation in the relative speed at which the material is delivered into the expansion region and extracted from this region. The expansion is performed by hydraulic pressure in a chamber which is closed by the inflatable plug and a conventional upstream plug.

The use of an inflatable plug in contact with a plastic pipe at a relatively high temperature poses problems as regards the choice of material for this plug. This is because it is necessary for the material to have sufficient elasticity to allow the plug to be inflated, while being resistant to the temperature and to the friction which are imposed by the plastic pipe. Furthermore, to achieve satisfactory sealing without causing excessively high friction between the plug and the internal surface of the pipe, it is difficult to adjust the internal pressure on the inflatable plug.

A first object of the invention is, above all, to provide a process for the continuous manufacture of plastic pipes with biaxial drawing which allows simple startup, by avoiding the problems posed by an inflatable plug, and which makes it possible to reduce the friction forces to which the pipe is subjected in the steady manufacturing state.

To achieve this object, according to a first arrangement of the invention, the process for the continuous manufacture of plastic pipes with biaxial drawing consists in producing a tube blank by extrusion, in taking this tube blank to the molecular orientation temperature, in making this tube blank pass around a radial expansion mandrel and in sizing and cooling the tube blank while subjecting it to an axial pulling force, and is characterized in that:

the radial expansion performed on the mandrel is partial so that the inside diameter of the tube blank, when it leaves the mandrel, is smaller than the nominal inside diameter of the finished pipe, and a further radial expansion of the tube blank, up to its nominal diameter, is performed by internal fluid pressure, the whole being such that, in the steady operating state, the internal surface of the tube blank is no longer in contact with the mandrel.

Advantageously, a chamber closed upstream and downstream of the mandrel is produced with the aid of at least an upstream plug and a downstream plug, each plug ensuring sealing, for example by comprising at least one disk made of a material sufficiently flexible for it to be able to flex and straighten in order to ensure sealing.

Advantageously, the downstream sealing plug of greater diameter than the upstream plug is introduced thanks to the initial expansion on the mandrel, thus allowing a sealed volume to be generated.

The pressurized fluid for the further expansion of the tube blank is admitted between the two sealing plugs.

A second object of the invention, which may be taken into consideration independently or in combination with the first object, is to provide a process for the continuous manufacture of plastic pipes with biaxial drawing which produces a practically constant axial elongation of the plastic.

To achieve this other objective, according to a second arrangement of the invention, which may be implemented independently or in combination with the previous arrangement, the process for the continuous manufacture of plastic pipes with biaxial drawing consists in producing a tube blank by extrusion, in taking this tube blank to the molecular orientation temperature, in radially expanding the tube blank, with sizing and cooling, while subjecting the tube blank to an axial pulling force, this process being characterized in that the friction force exerted on the tube blank and the pipe is detected and in that at least one operating parameter is acted upon in order to keep this friction force approximately constant.

Such regulation produces a constant axial orientation (axial elongation), resulting in the finished pipe having a constant thickness and constant physical properties.

The friction force may be detected by measuring the pulling force exerted on the pipe. The operating parameter acted upon in order to keep the friction force approximately constant may consist of the internal pressure in the pipe and/or of a partial vacuum created around the pipe in a sizing device. According to another possibility, the friction force is regulated by injecting a lubricating fluid, especially water, between the pipe and the wall of the sizing device.

The above regulation may be combined with upstream regulation designed to keep the characteristics of the tube blank constant.

To do this, the characteristics of the tube blank, in particular the thickness and diameter of the tube blank, are measured and, in response to the results of the measurements, the extruder is acted upon in order to keep the characteristics of the tube blank constant.

According to the first or the second arrangement, the pulling force on the pipe is advantageously exerted at a single point, downstream of a sizing region, by at least one haul-off.

The invention also relates to a line for the continuous manufacture of plastic pipes with biaxial drawing, for implementing the first process arrangement, comprising:

an extruder conventionally equipped for forming a tube blank;

at least one tank for raising the tube blank to the molecular orientation temperature;

a device for the progressive radial expansion of the tube blank, comprising an expansion mandrel kept stationary relative to the extruder;

a sizing device and a device for cooling the pipe, the manufacturing line being characterized in that the mandrel has a maximum diameter smaller than the nominal inside diameter of the pipe, in that a plug is located upstream of the mandrel, in that at least one other plug is located downstream of the mandrel, in order to produce a seal depending on the nominal inside diameter of the pipe, and in that a pressurized-fluid admission means is provided at a point located between the two sealing plugs, in order to admit pressurized fluid and to expand the pipe to its nominal inside diameter.

In such a manufacturing line, in the steady state, the pipe is no longer in contact, via its internal wall, with the mandrel.

Advantageously, a coaxial tube is fixed to the extruder and the mandrel is fixed to the end of this tube which has a channel emerging radially via at least one opening, between the two sealing plugs, for injecting pressurized fluid.

Advantageously, the biaxial orientation part of the manufacturing line includes means for pulling on the pipe, particularly a haul-off, at a single point located downstream of the sizing device and of the cooling device.

The downstream plug may be located downstream of the cooling tanks and be attached to the mandrel by a flexible linking element, especially a cable.

As a variant, the downstream plug is located immediately behind the mandrel, thereby reducing the size of the sealed volume.

The mandrel has an axisymmetric, for example frustoconical, overall shape, the large base of which faces the opposite side from the extruder; advantageously, the mandrel is provided, on its surface, with rolling members distributed angularly and axially so as to avoid marking the internal surface of the pipe and to reduce the friction forces.

The rolling members preferably consist of cylindrical or spherical rollers mounted so as to rotate.

Advantageously, the final tank for raising the temperature and/or the sizing device are mounted so as to be able to be moved one with respect to the other, in axial translation, especially to change their separation, and make it easier to start up the manufacture.

The invention also relates to a line for the continuous manufacture of plastic pipes with biaxial drawing which, independently of the above features or in combination with these features, comprises:

an extruder conventionally equipped for forming a tube blank;

at least one tank for raising the tube blank to the molecular orientation temperature;

a device for radially expanding the tube blank by internal fluid pressure;

a sizing device and a device for cooling the pipe;

means for pulling the tube blank axially; this manufacturing line being characterized in that it includes means for detecting the friction force exerted on the tube blank and the pipe, and means for acting upon at least one operating parameter of the manufacturing line in order to keep this friction force approximately constant.

Advantageously, the means for pulling on the tube are located at a single point, downstream of a sizing region, and comprise at least one haul-off.

The friction force may be detected by means for measuring the pulling force exerted on the pipe.

Advantageously, means for measuring the characteristics of the tube blank, in particular the thickness and diameter of the tube blank, are provided and means for acting upon the extruder in response to the results of the measurements, in order to keep the characteristics of the tube blank constant.

The invention also relates to a biaxially drawn plastic pipe obtained by the process and/or the manufacturing line described above.

The invention consists, apart from the arrangements presented above, of a number of other arrangements which will be explained in more detail below in regard to illustrative examples described in detail with reference to the drawings appended hereto, but which are in no way limiting.

FIG. 1 of these drawings is a schematic axial section, with parts on the outside and parts removed, of a the manufacturing line as claimed in the invention, at the start of production.

FIG. 2 shows schematically part of the line after the expansion mandrel has been put into place at the inlet of the sizing device.

FIG. 3 shows, in a manner similar to FIG. 2, the manufacturing line at the start of injecting the pressurized fluid.

FIG. 4 shows, in a manner similar to FIG. 3, the manufacturing line after a plug has been placed downstream of the haul-off.

FIG. 5 shows, in a manner similar to FIG. 4, the manufacturing line when the production steady state has been established.

FIG. 6 shows, in a manner similar to FIG. 5, an alternative.

Figure 10:
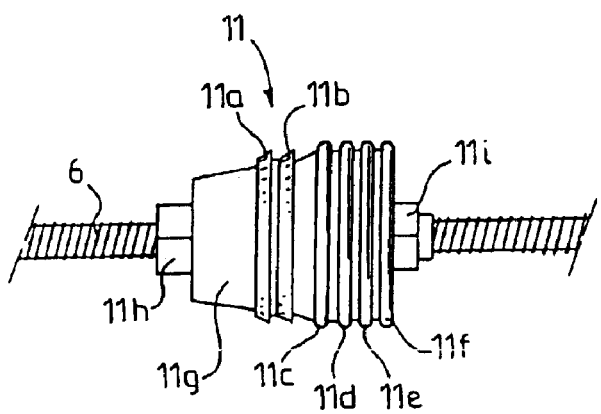

Finally,

FIG. 10 is a side view of an illustrative example of an upstream plug.

In the drawings, especially FIG. 1, may be seen a manufacturing line 1 employing the process of the invention. The production is carried out continuously from the upstream end (to the left in FIG. 1) to the downstream end (toward the right in FIG. 1).

The manufacturing line comprises, shown schematically, an extruder 2 fed with thermoplastic, especially PVC, from a hopper 3 shown schematically (dry-blend feed). The extruder 2 is provided at its front end, on the opposite side from the hopper 3, with tooling 4 for extruding a pipe tube blank E. The tooling 4 includes one or more lateral inlets 5 for admitting and/or discharging pressurized air, or more generally a pressurized fluid (gas or liquid). Furthermore, a sizing die (not shown) is conventionally provided.

A coaxial metal tube 6 is fixed to the extruder 2 and extends toward the right in FIG. 1. This tube 6 has, toward its closed axial end, at least one radial opening 7. When pressurized air is admitted via the inlet 5, this air is directed by channels (not shown) from the tooling 4 into the tube 6, to leave via the opening 7.

A pipe tube blank E leaves the extruder 2 at a relatively high temperature of around 150° C. or more and passes through one or more cooling tanks 8, generally containing water, which are thermally regulated for example to 10–20° C. in order to substantially lower the temperature of the tube blank E. A conventional haul-off (not shown) is generally provided downstream of the cooling tanks 8. This haul-off, which acts upon a tube blank when still hot, and therefore deformable, is not actually used to transfer thrust forces but only to decouple the extrusion, and biaxial drawing functions, by damping the perturbations and interaction of one on the other.

The biaxial orientation part of the tube blank starts downstream of the haul-off (not shown) of the extrusion part. This biaxial orientation part comprises a thermally regulated tank 9, for cooling or heating, in order to raise the tube blank E to a temperature lying within the range of molecular orientation temperatures. For PVC, this temperature lies within a range from 90° C. to 110° C.

Fixed to the outlet of the tank 9 is a ring 10 for externally pressing the tube blank onto an internal plug 11 upstream, shown in FIGS. 2 to 6. This internal plug 11 is located upstream of orifice 7.

As may be seen in FIG. 10, the internal plug 11 may comprise, from the upstream end to the downstream end, a succession of sealing rings, especially two relatively flexible rings 11a, 11b, for example made of an elastomer, the periphery of which is formed by a frustoconical lip whose large base faces downstream. Several disks 11c, 11d, 11e, 11f, for example made of polytetrafluoroethylene (PTFE), spaced apart, parallel to one another and perpendicular to the axis of the tube blank, are provided downstream of these rings 11a, 11b. The outside diameter of the rings and of the disks is at least equal to the inside diameter of the tube blank E.

The succession of rings and disks 11a–11f forms a stack held by a metal core 11g locked together, so as to be able to be adjusted along the axial direction, by nuts 11h, 11i screwed on to the tube 6 consisting of a hollow threaded rod.

The Example of the plug 11 described in detail above is not limiting, any possible equivalent sealing means being suitable.

A radial expansion mandrel 12, which can be seen in FIG. 2, is fixed, under conditions explained below, to that end of the tube 6 on the opposite side from the extruder 2. The mandrel 12 has an axisymmetric overall shape and consists, for example, of a truncated cone. The large base 12a of the mandrel faces downstream. The diameter B of the large base 12a is smaller than the nominal inside diameter D (FIG. 4) of the finished pipe T.

Preferably, the diameter B is at least 10% smaller than the diameter D.

Figure 7:
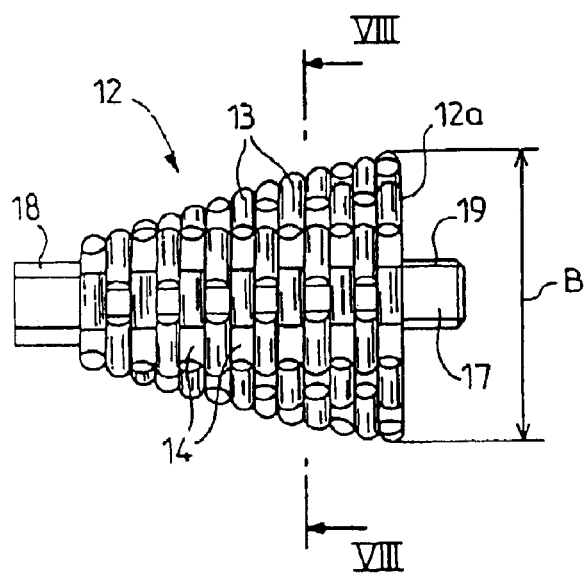
FIG. 7 is a side view on a larger scale of the radial expansion mandrel.
Figure 8:
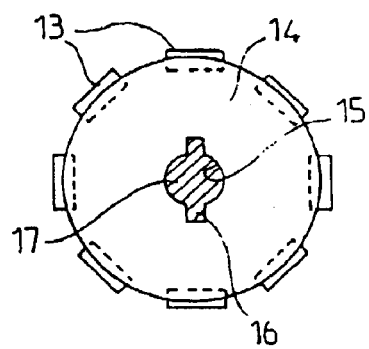
FIG. 8 is a view, on the line VIII—VIII in FIG. 7, of one element of the mandrel.
Figure 9:
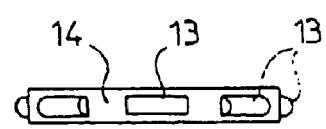
FIG. 9 is a top view of the mandrel element of FIG. 8.

As illustrated in FIG. 7, the mandrel 12 is advantageously provided on its surface with cylindrical or spherical rollers 13, mounted so as to rotate on spindles (not visible) carried by the mandrel 12. The rollers 13 are partly housed in cavities on the surface of the mandrel and project from this surface. The axes of rotation of the rollers 13 lie in several parallel planes, perpendicular to the axis of the mandrel 12. The rollers 13, lying in the same plane, are uniformly distributed around the axis of the mandrel. The rollers lying in successive planes are offset in a staggered fashion so as to prevent any generatrix of the mandrel 12 being devoid of a roller.

Advantageously, the mandrel 12 consists of a frustoconical stack of disks 14 having diameters which increase from the upstream end to the downstream end. Each disk has rollers 13 uniformly distributed on its periphery in the manner of a crown. The disks 14 have a central opening 15 with one or more recesses 16 for mounting on a shaft 17, of conjugate section, so as to be prevented from rotating. An axial stop 18 is provided on the shaft 17 in order to retain the smallest diameter disk. On the opposite side, the shaft 17 has a thread 19 allowing the stack of disks 14 to be locked with the aid of a nut engaging with this thread.

The mandrel 12 may thus be adjusted to various inside diameters of tube blanks by adding or removing disks 14 of appropriate diameters.

The cylindrical or spherical rotating rollers 13 allow the friction of the tube blank on the mandrel to be considerably reduced and prevent marks on the internal surface of the pipe.

A coaxial plug 20 is fixed to the mandrel 12 on the same side as the large base 12a, on the opposite side from the tube 6. This plug 20 is, for example, formed by at least one, and preferably several, disks 21 spaced apart, parallel to one another, which are made of a plastic having a low coefficient of friction, such as polytetrafluoroethylene (PTFE) or a thermoplastic elastomer (TPE), which may or may not be reinforced. The disks 21 are made of a material sufficiently flexible to be able to flex and straighten in order to ensure sealing. The plug 20 is designed to ensure sealing at least along a diameter equal to the diameter B of the large base of the truncated cone 12. Other explanations on this subject will be given with regard to the variant in FIG. 6.

A flexible linking member 22, for example a cable, is furthermore attached to the center of the mandrel 12 on the opposite side from the tube 6. The plug 20 may be installed on that part of the cable 22 close to the mandrel 12.

Downstream of the mandrel 12, the tube blank enters a sizing device 23 (shown schematically). This sizing device 23 is placed in a water-spray vacuum cooling tank 24. The spraying of water on the external surface of the plastic pipe leaving the sizing device 23 allows the material to solidify. On leaving the tank 24, the pipe T in the finished state passes into a haul-off 25 which exerts the necessary pulling force on the entire line in order to haul the pipe and the tube blank. The haul-off 25 conventionally consists of two caterpillar tracks 26, 27 bearing against opposed regions of the pipe in order to haul it from the left to the right in FIG. 1. Each caterpillar track has a flexible element 28 forming an endless loop wrapped around wheels 29, at least one of which is driven, these wheels 29 being mounted so as to rotate about spindles 30 supported by a stand 31 fixed to the ground.

The pulling force exerted by the haul-off 25 is detected by a sensor 32 (FIG. 1), for example at the point where a spindle 30 is mounted on the stand 31.

The output of the sensor 32 (FIG. 1) is connected to a unit 33, allowing the degree of vacuum in the tank 24 to be adjusted in response to the output signal from the sensor 32, and to a unit 34 allowing the pressure of the air delivered by the orifice 7 to be adjusted.

The unit 33 may, if necessary, cause water to be injected with the aim of reducing the friction between the pipe and sizing device 23 if the force measured by the sensor 32 is too high.

A sensor j is advantageously provided at the exit of the extruder 2 in order to measure the diameter of the tube blank. Several other sensors h, for example ultrasonic sensors, are distributed around the periphery of the tube blank, close to the exit of the extruder 2, in order to measure the thickness of this tube blank. The sensors j and h are connected to a control unit K suitable for acting upon the operating parameters of the extruder 2 in order to keep the dimensions of the tube blank, at the exit of the extruder 2, as constant as possible according to the values measured by the sensors j and h.

The tank 24 and the sizing device 23 are mounted so as to be adjustable in the axial direction, as is the tank 9. These elements are mounted so as to move in translation, for example on rails fixed to the ground (not shown in the drawing), with means for blocking in a desired position.

The distance L between the downstream face of the tank 9 and the upstream face of the tank 24 is thus adjustable.

In the steady operating state, a downstream plug 35 (FIG. 4) fastened to the cable 22 bears in a sealed manner against the internal surface of the pipe T. The plug 35 may consist of disks 36 which are spaced apart, parallel to one another and perpendicular to the axis of the tube and are made of a material such as PTFE or a thermoplastic elastomer (TPE), which may or may not be reinforced. The plug 35 is designed to provide sealing along the inside diameter D of the finished pipe.

From the foregoing description, it is apparent that the manufacturing line is composed of two different parts, with the minimum of interactions:

a tube blank extrusion part consisting of a conventional extrusion line (extruder 2, tooling 4, sizing die, not shown, cooling tanks 8, haul-off, not shown);

a tube blank biaxial orientation part with tanks 9 for bringing it to temperature, expansion device (12; 6, 7, 11, 20, 35, 20a), sizing device 23, cooling device 24, haul-off 25 and saw (not shown).

This being the case, the operation of the manufacturing line, employing the process of the invention, is as follows.

The line startup is illustrated by FIGS. 1 to 4.

According to FIG. 1, a tube blank E leaves the extruder 2, in a relatively pasty state, and travels right down the line. To ensure this travel down the line, an auxiliary pulling tube may be used which is introduced from the downstream end, upstream into the line until coming close to the exit of the extruder; the tube blank is attached by any suitable means to this pulling tube which, hauled by the haul-off 25, hauls the tube blank itself through the tanks 8, 9 and 24.

The radial expansion mandrel 12 is not yet installed (FIG. 1) and there is no pressurized air injection via the inlet 5 and the outlet orifice 7. The tank 9 is set back upstream, while the tank 24 is advanced downstream so that the distance L is the maximum.

The mandrel 12 and the plug 20 are then fitted. To do this, a slit is made along a generatrix in the wall of the tube blank in a region lying between the tank 9 and the tank 24. The edges of the slit are moved apart in order to fit, downstream of the orifice 7, the plug 11 as illustrated in FIG. 2. The mandrel 12 is then fixed to the end of the tube 6, for example by screwing, and the cable 22 is introduced along the entire length of the tube blank so as to be able to recover the end of this cable downstream of the tank or tanks 24 for cooling the biaxially oriented pipe, optionally cutting off, using a saw (not shown), a downstream part of the tube blank.

With material continuing to arrive, the slit made in the tube blank, for fitting the plug 11 and the mandrel 12, moves downstream and disappears. At this moment, the tube blank undergoes its first expansion in contact with the mandrel 12 (FIG. 2). There is still no injection of pressurized air via the orifice 7.

When the tube blank has been correctly closed off downstream of the mandrel 12, the tank 9 is moved downstream, as illustrated by an arrow in FIG. 3, so that the ring 10 is placed around the plug 11. Air is then injected via the inlet 5 and the orifice 7, with a gradual rise in the pressure so that the tube blank separates slightly from the mandrel 12, as illustrated in FIG. 3.

With increasing air pressure, the tube blank moves completely away from the mandrel 12, as illustrated in FIG. 4, and comes into contact with the sizing device 23. The inside diameter of the pipe then reaches its nominal value D greater than the diameter B of the large base of the mandrel 12.

The downstream plug 35 is fitted to the end of the cable downstream of the cooling tank or tanks 24 and thus provides further sealing.

As a variant, it defines with the downstream plug 20 a chamber in which air pressure provides, after the sizing device, the additional cooling of the formed pipe.

When the steady state has been established, the tank 24 is moved toward the tank 9, as illustrated by an arrow in FIG. 5, in order to reduce the space between these two tanks and increase the distance between the internal surface of the tube blank and the mandrel 12.

Preferably, a pulling force is exerted on the tube only downstream of the tank 24. The value of the pulling force measured by the sensor 32 (FIG. 1) constitutes a measurement of the friction of the tube blank and of the pipe in the line, particularly in the sizing device 23. The regulating effected on the basis of this force measurement by the sensor 32 makes it possible to work with a pulling force, and therefore a friction force, which is approximately constant, thereby corresponding to an approximately constant axial orientation (axial elongation) of the material of the pipe T.

The friction force is kept approximately constant by the unit 34 (FIG. 1) which acts upon the internal pressure, in the tube blank and in the pipe, according to the value detected by the sensor 32. It is also possible to act upon the degree of vacuum in the tank 24, around the pipe, or by injecting lubricating water between the pipe and the internal wall of the sizing device 23.

This regulation is effective if the dimensional characteristics of the tube blank are constant. To improve the manufacture, provision may be made to also regulate the tube blank leaving the extruder 2 with the aid of sensors j and h (FIG. 1) which, via the values detected, allow the unit K to change the operating conditions of the extruder 2 in order to keep the dimensional characteristics of the tube blank approximately constant.

FIG. 6 illustrates an alternative embodiment in which the downstream plugs 20 and 35 of the previous embodiment now form only a single plug 20a located immediately downstream of the mandrel 12. This plug 20a also preferably consists of parallel disks 21a, perpendicular to the axis of the tube. The disks must be flexible enough to be able to flex and, in a first step ensure sealing along the diameter B corresponding to the large base of the mandrel 12. The disks 21a of the plug 20a must be able, by dint of their elasticity, to straighten and then ensure sealing along the nominal inside diameter D of the pipe. The approach shown in FIG. 6 has the advantage that the closed chamber lying between the upstream plug 11 and the downstream plug 21a has a smaller volume. This results in lower inertia as regards pressure variations and temperature variations which may be controlled. Since the volume of air stored is smaller, should a leak or an incident occur, the risks are also reduced.

In the foregoing description, the fluid used to generate the internal pressure in the tube blank is air. Of course, this fluid could be a liquid, in particular hot water.

What is claimed is:

1. A process for continuously manufacturing plastic pipes with biaxial drawing, comprising:

forming a tube blank by extrusion, the tube blank being taken to the molecular orientation temperature, made to pass around a radial expansion mandrel member, and sized and cooled while being subjected to an axial pulling force, wherein the radial expansion performed on the mandrel member is partial so that the inside diameter of the tube blank, when it leaves the mandrel member, is smaller than the nominal inside diameter of the finished pipe; and performing a further radial expansion of the tube blank, up to its nominal diameter, by an internal fluid pressure;

whereby, in the steady operating state, the internal surface of the tube blank is no longer in contact with the mandrel member.

2. The process as claimed in claim 1, wherein a chamber closed upstream and downstream of the mandrel member is formed with the aid of at least one upstream plug and at least one downstream plug, each plug comprising at least one disk made of a material sufficiently flexible for it to be able to flex and straighten to ensure the sealing of the chamber.

3. The process as claimed in claim 2, wherein the downstream plug has a greater diameter than that of the upstream plug, the downstream sealing plug being introduced subsequent to the initial expansion on the mandrel member, allowing a sealed volume to be generated.

4. The process as claimed in claim 2 further comprising admitting a pressurized fluid between the two sealing plugs for further expansion of the tube blank.

5. The process as claimed in claim 1 further comprising detecting a friction force exerted on the tube blank and the pipe, wherein at least one operating parameter is acted upon in order to keep the friction force approximately constant.

6. The process as claimed in claim 5, wherein the friction force is detected by measuring the pulling force exerted on the pipe.

7. The process as claimed in claim 5, wherein the operating parameter comprises the internal pressure in the pipe and/or of a partial vacuum created around the pipe in a sizing device.

8. The process as claimed in claim 5, wherein characteristics of the tube blank are measured and, in response to the results of the measurements, the extruder is acted upon in order to keep the characteristics of the tube blank constant.

9. The process as claimed claim 1, wherein the pulling force on the pipe is exerted at a single point located downstream of a sizing device and a cooling device.

10. A plastic pipe obtained by the process as claimed in claim 1.

11. A manufacturing line for the continuous manufacture of plastic pipes with biaxial drawing, comprising:

an extruder member adapted to form a tube blank;

at least one tank member for heating the tube blank to the molecular orientation temperature;

an expansion device for progressively radially expanding the tube blank, the expansion device comprising an expansion mandrel member kept stationary relative to the extruder member, the maximum diameter of the mandrel member being smaller than the nominal inside diameter of the finished pipe;

a first plug member located upstream of the mandrel member;

a second plug member located downstream of the mandrel member for producing a seal depending on the nominal inside diameter of the pipe; and a pressurized-fluid admission means located between the upstream plug and the downstream plug for admitting a pressurized fluid and for expanding the pipe to its nominal inside diameter.

12. The manufacturing line as claimed in claim 11, wherein, in the steady state, the internal wall of the pipe is away from the mandrel member.

13. The manufacturing line as claimed in claim 11 further comprising a coaxial tube fixed to the extruder, wherein the mandrel member is fixed to the end of the coaxial tube that has a channel emerging radially via at least one opening, upstream of the mandrel member, and downstream of the upstream plug for injecting pressurized fluid.

14. The manufacturing line as claimed in claim 11 further comprising means for pulling the pipe located downstream of a sizing device and of a cooling device.

15. The manufacturing line as claimed in claim 14, wherein the downstream plug is located downstream of the pulling means and attached to the mandrel member by a flexible linking element.

16. The manufacturing line as claimed in claim 14 further comprising means for measuring the pulling force exerted on the pipe.

17. The manufacturing line as claimed in claim 11, wherein the downstream plug is located immediately behind the mandrel member.

18. The manufacturing line as claimed in claim 11, wherein the mandrel member comprises an axisymmetric shape, the large base of which faces the opposite side from the extruder.

19. The manufacturing line as claimed in claim 18, wherein the mandrel member comprises a frustoconical overall shape, the large base of which faces the opposite side from the extruder.

20. The manufacturing line as claimed in claim 18, wherein the mandrel member is provided on its surface with rolling members distributed angularly and axially so as to reduce the friction.

21. The manufacturing line as claimed in claim 20, wherein the rolling members comprise cylindrical or spherical rollers mounted so as to rotate.

22. The manufacturing line as claimed in claim 11 further comprising a sizing device, wherein the tank for raising the temperature and/or the sizing device are so mounted that they are capable of moving relatively to each other, in axial translation, to change their separation.

23. The manufacturing line as claimed in claim 11 further comprising means for detecting the friction force exerted on the tube blank and the pipe, and means for acting upon at least one operating parameter of the manufacturing line to keep the friction force approximately constant.

24. The manufacturing line as claimed in claim 11 further comprising means for measuring characteristics of the tube blank, and means for acting upon the extruder in response to the results of the measurements to keep the characteristics of the tube blank constant.

25. The manufacturing line as claimed in claim 24 further comprising means for measuring the thickness or the diameter of the tube blank.

* * * * *